Jan. 13, 1931.  H. M. KOEBLER  1,788,722

SUPPORT FOR HAMS AND OTHER MEAT PRODUCTS

Filed Aug. 6, 1928

Inventor
Herbert M. Koebler
By Thomas Bieyer
Attorney

Patented Jan. 13, 1931

1,788,722

UNITED STATES PATENT OFFICE

HERBERT M. KOEBLER, OF PORTLAND, OREGON

SUPPORT FOR HAMS AND OTHER MEAT PRODUCTS

Application filed August 6, 1928. Serial No. 297,899.

My new and improved meat support relates to supporting devices for hams, smoked meats, picnic hams and the like and has for its primary object the supporting of the meat products during curing and thereafter for the supporting and displaying of the meat products.

The primary object of my device is in economy of manufacture, economy in time of application of the device to the meat product and safety in supporting the same especially in the curing and smoking operation.

Still further objects of my device relates to the lesser damage to the meat during the application of the same to the meat to be supported and cured.

Still further objects of my device consist in a supporting element that may be used many times without destroying, or in any way impairing the life of the same.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

Figure 1:
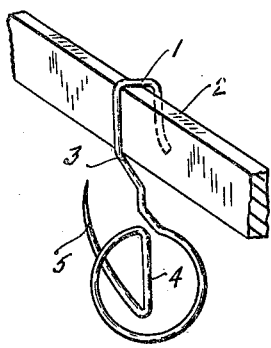
Fig. 1 is a perspective view of one of my new and improved hangers in place upon the supporting bar for displaying meat products.

Heretofore it has been the general custom in the displaying and in the curing of meat, hams, dried meat, picnic hams and the like to support the same upon a fabric string, rope, or cord. This method of supporting required the piercing of the meat element with a piercing tool and the withdrawal of the same after the supporting cord had been passed through the eye of the piercing instrument. The cord was drawn through the wound thus made in the meat. In the curing and smoking operation, the cord many times became loosened or disengaged thereby permitting the meat product to fall into the fire. Also the cost of cord is an expensive item and utterly unsanitary. The insertion of the piercing instrument is a most wasteful method, thereby causing an economic loss both in meat as well as in cord and other perishable supports.

Like reference characters refer to like parts throughout the several views.

Figure 2:
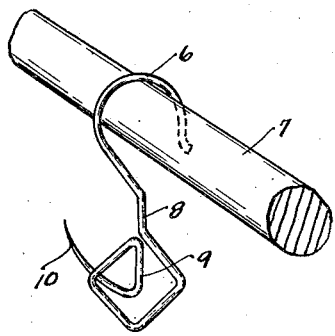
Fig. 2 is a perspective view in modified form of my supporting device.

The device is preferably made of one piece of metallic material having a loop 1 disposed at its upper end adapted to engage upon a supporting element 2, as a display rack, or a support rack disposed within the refrigerator box. A stem 3 downwardly extends from the loop 1, being preferably off-set, so that the center 4 is directly suspended beneath the center of the loop 1. The hook 5, upwardly extends from the center support and is upwardly turned sufficient to prevent the falling therefrom of the meat to be supported thereupon. The form of supporting element illustrated in Fig. 1, is used wherein the meat to be displayed will be disposed to an edge view. Where a side view support is used, the support used in Fig. 2, is found to be a preferable form wherein the yoke 6 is adapted to engage and be supported upon the supporting element 7. In most meat racks and cold storage boxes, rectangular bars are used, as that illustrated in Fig. 1, but in smoke houses and on smoke racks, round supporting element is in general use, as illustrated in Fig. 2, and therefore the support to which the yoke is adapted will predetermine the shape thereof. The supporting shank 8 being sufficiently off-set to suspend the central portion 9 of the yoke immediately beneath the supporting bar 7; a supporting hook 10 being outwardly extending from the central portion and upturned sufficiently to prevent the falling of the meat therefrom to be displayed thereupon.

Figure 4:
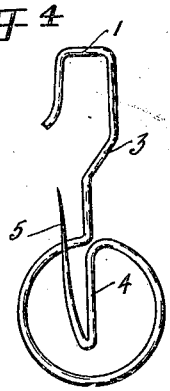
Fig. 4 is a side view of my device especially adapted for the displaying and smoking of hams.
Figure 5:
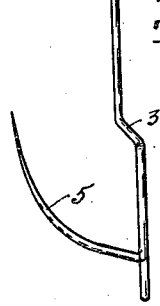
Fig. 5 is a side view of the device shown in detail in Fig. 4.
Figure 6:
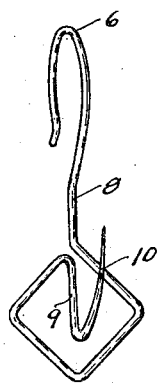
Fig. 6 is a front view in modified form.
Figure 3:
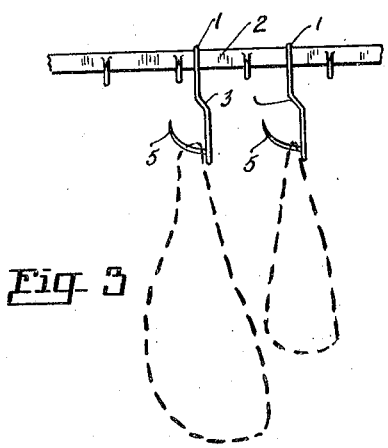
Fig. 3 is a side view of my new and improved device, illustrating the use of the same in the displaying of meat products.

While I have shown my device in several views, in slightly modified form, in preferred embodiment, I have found best results obtain both in the use and in the life of the device and in the economy of manufacture wherein the same is made of a single piece preferably of spring or high carbon material that has been tuned or galvanized and made substantially as illustrated. The modified forms, as illustrated in Figs. 4, 5 and 6 are only modifications of the principle.

While the form of mechanism herein shown and described, is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:—

A meat supporting hook comprising a one piece resilient body element having a shank support disposed at its upper end, a stem downwardly extending and off-set to bring the same substantially beneath the center of the yoke, then a circular loop arrangement ending in an upwardly inclined sharp pointed hook outwardly extending from a point central of the loop and substantially in line with upper part of stem, substantially as shown and described.

HERBERT M. KOEBLER.